Jan. 19, 1965    G. M. MAGRUM    3,165,945
TORSIONAL VIBRATION DAMPER
Filed Sept. 22, 1961    3 Sheets-Sheet 2
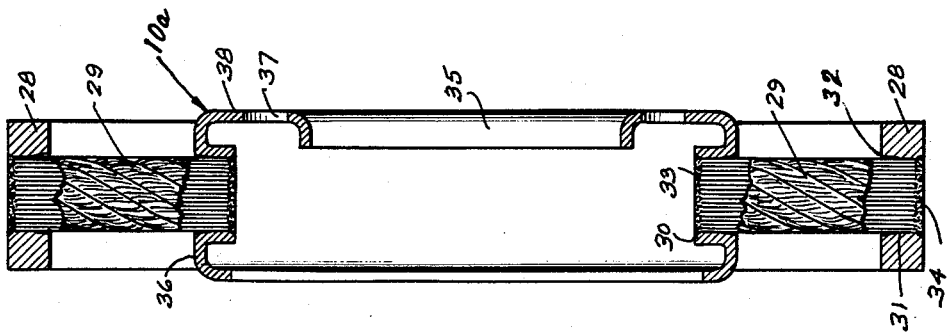
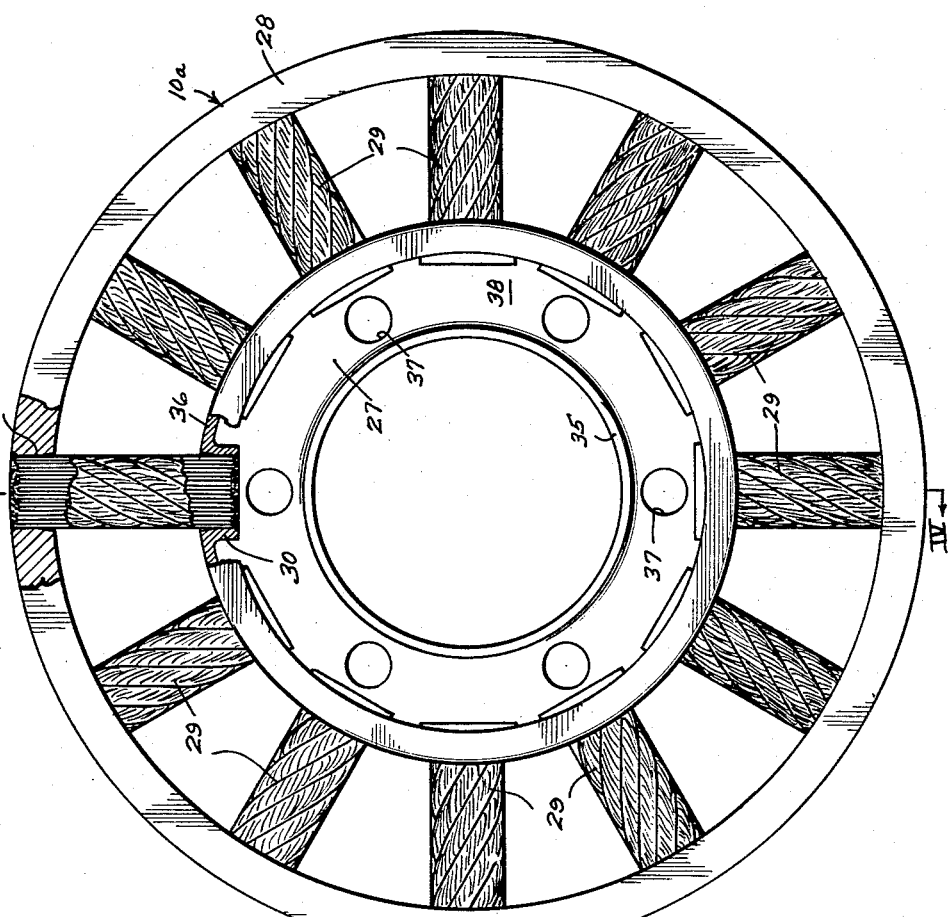
INVENTOR.
Gervase M. Magrum
BY
ATTORNEYS

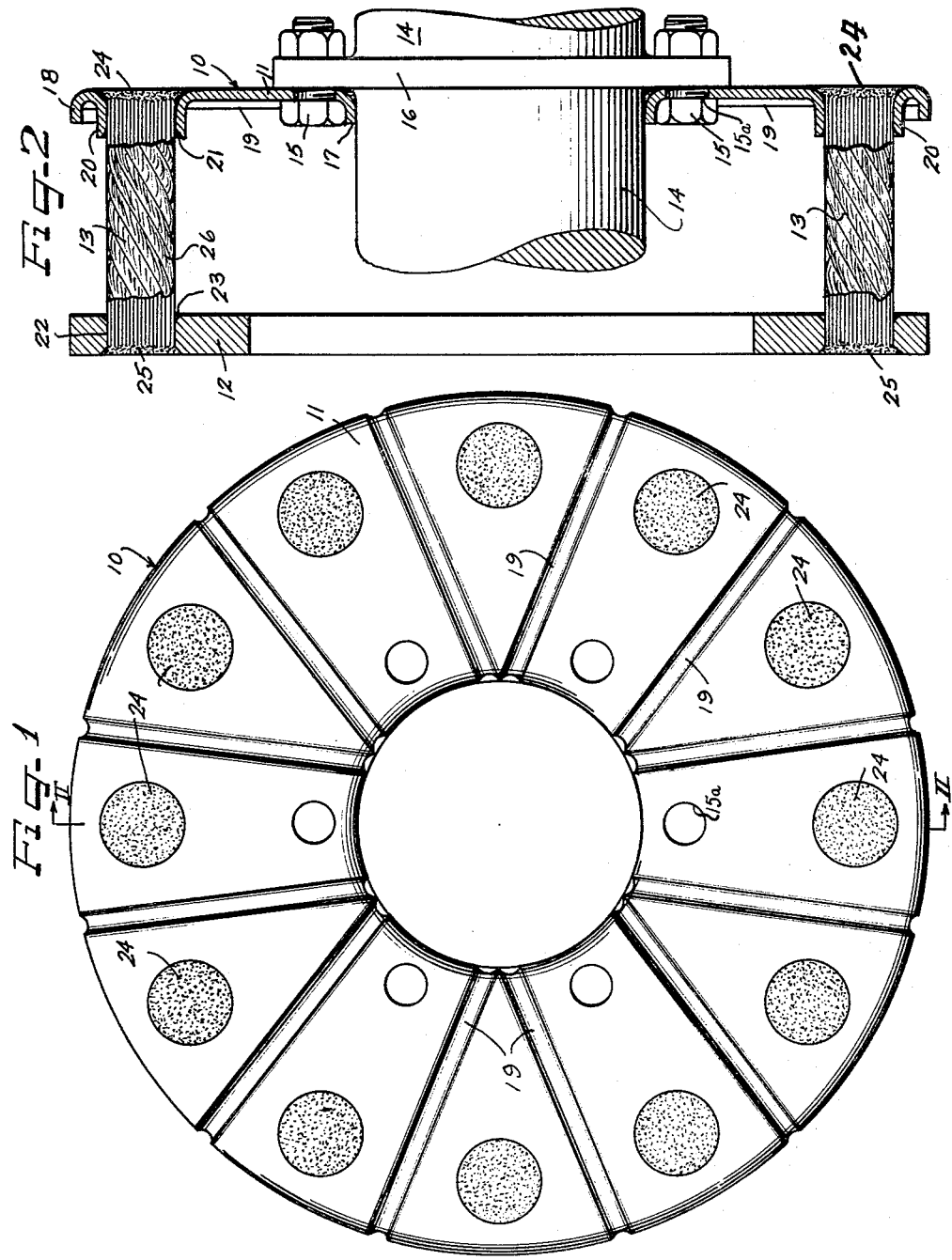

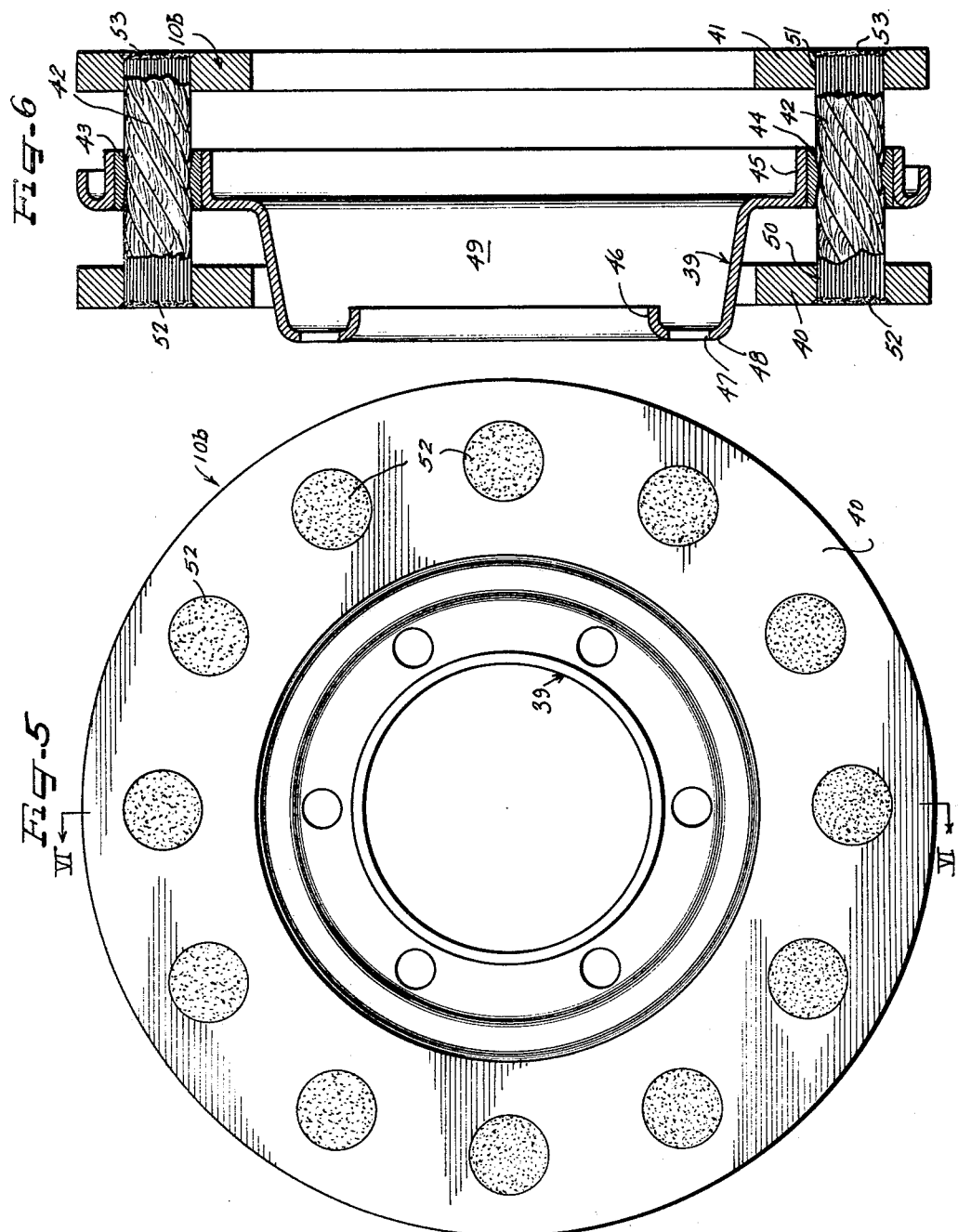

3,165,945
TORSIONAL VIBRATION DAMPER
Gervase M. Magrum, Williamsville, N.Y., assignor to
  Houdaille Industries, Inc., Buffalo, N.Y., a corporation
  of New York
Filed Sept. 22, 1961, Ser. No. 140,038
10 Claims. (Cl. 74—574)

This invention relates to vibration dampers, and more particularly to vibration dampers for torsionally oscillating masses such as crankshafts and the like.

Crankshafts and other rotary structures are generally subject to torsional oscillations or vibrations which may result from periodic torque imparted thereto, as occurs with piston operated machines and the like. The periodic application of the torque to a crankshaft results in an overrun effect or torsional vibration throughout the shaft which, particularly at relatively high frequencies, may give rise to fatigue failure and damage to mechanism associated with the inertial mass.

Torsional vibration dampers for affecting the natural frequency and energy absorbing characteristics of a rotating mass may be broadly classified as tuned or untuned, in accordance with the generic principle utilized in dissipating the energy of harmonic vibration in the mass. Untuned dampers have generally been characterized by a design employing viscous fluid wherein the energy of harmonic vibrations is converted to and dissipated as heat. Friction damping constructions may also fall within this general category. Tuned dampers have resolved the problem of torsional oscillation by means such as springs, or elastomers between carrier and flywheel elements of the damper. In these latter configurations, the interposed spring or elastomer constituents act as structurally resilient alignment members as well as damping members. The concept of the tuned damper is thus based on the calibration of different masses for the flywheel and member of angular momentum or main mass, so that the connection between the elements will cause the flywheel to vibrate or oscillate at a different amplitude than the main mass, and which is out of phase with the amplitude of vibration or oscillation of the main mass. Thereby, a tendency toward relative motion of the flywheel and the main mass is created, which is resisted by the spring or elastomer means to produce the damping action. Thus the proportions of the flywheel and its resilient connection with the inertial mass must be such that the flywheel has a natural frequency somewhat lower than the natural frequency of the main mass. And when the frequency of the exciting force in the main mass approaches the natural frequency of the main mass and the damper combination, the damper flywheel is caused to vibrate with an amplitude which is large in proportion to the amplitude of vibration of the main mass, so that energy is then absorbed in the spring or elastomer connection, because of the relative motion therebetween. Such absorption may also be effected by a viscous fluid between the relatively rotating elements.

While the previously available arrangements often give relatively satisfactory performance, in respect to both tuned and untuned types of dampers, they nevertheless have disadvantages resulting in uneconomical production, shortened working life and non-uniformity in respect to repeated performances or repeatability, as well as with respect to environmental conditions. In the case of elastomers, variation in the physical characteristics of the elastomers is experienced resulting from chemical and molding differences in the compound batches. And the adjustment of springs and elastomers to compensate for physical and dimensional vibrations requires rather expensive techniques of fabrication and assembly in order to afford results which are uniformly repeatable. Where variable or uncontrolled operating conditions exist, as in the case of the internal combustion engine, an even greater unpredictability is found in the operation of the previously available vibration dampers.

The present invention may be generally characterized as a tuned damper construction, and effectively resolves the foregoing problems by transferring energy of vibration generated in a crankshaft or the like to spring-action, semi-rigid, resiliently flexible cable elements which perform a damping function and to a damping inertial mass supported on the cable elements and providing a tuning element. The damping inertial mass or tuning element has a frequency which is a percentage of the engine's natural frequency, imposed on the crankshaft in rotating the same, and thereby, when the engine crankshaft or the like is excited at one of several critical speeds in a particular frequency, the excitation is transferred to the damping inertial mass and cable system. Thus cyclic variations in torsion, superimposed on crankshaft rotation, are eliminated and transferred to the mass with magnification. Friction damping is introduced into the cable elements to restrict excursion or amplitude thereof, thereby reducing stress and prolonging life therein.

Accordingly, it is an object of the present invention to provide a vibration damper constructed in a manner such as to avoid the above noted objections and disadvantages relative to the prior art structures.

Another object of the invention is to provide a system as described characterized by economy of manufacture of the damping inertial mass and supporting carrier and wherein press-form methods may be utilized in substitution for previous methods requiring close tolerances and expensive, time consuming machining.

Another object of the invention is to provide a device as described which affords a novel spring and damping medium by the use of resilient cable structures wherein the spring action of the cable structures and the inherent damping action thereof are utilized in absorbing energy from the rotating crankshaft or the like.

Another object of the invention is to provide a design concept as described wherein the character of the cables and their positioning may be arranged to effect any needed requirement of tuned vibration damping.

Another object of the invention is to produce a device as described which takes the energy generated in a revolving and displaced mass, transforms it partly to heat by inter-wire rubbing friction and enforces a node at the damper which is opposite to and equal to the exciting force in the main rotational mass for the frequency or frequencies for which tuning is made.

Other objects and advantages of the invention will become apparent as the description proceeds in accordance with the drawings in which:

FIGURE 1 is a rear elevational view of an embodiment of a damper according to the present invention;

FIGURE 2 is a vertical sectional view taken along the lines II—II of FIGURE 1;

FIGURE 3 is a front elevational view of another embodiment of a damper according to the present invention;

FIGURE 4 is a vertical sectional view through the line IV—IV of FIGURE 3;

FIGURE 5 is a front elevational view of still another embodiment of a damper according to the present invention; and FIGURE 6 is a vertical sectional view taken through the line VI—VI of FIGURE 5.

Referring now to the drawings, and to FIGURES 1 and 2 in particular, a torsional vibration damper 10 is shown, illustrative of an axial cable type of damper according to the present invention. The damper or assembly 10 thus includes a supporting member 11, an inertial mass ring 12 and a plurality of spring and inertial elements comprising semi-rigid, resiliently flexible cable elements 13 fastened securely between the supporting member 11 and inertial mass ring 12 in circumferential, uniformly angularly spaced relationship, to provide a controlled span between the members 11 and 12 as hereinafter further described.

The damper 10 may be mounted concentrically to a driven rotary shaft of a machine or to a crankshaft of an internal combustion engine where torsional excitation occurs as produced by, for example, uniform increments of torque from pistons or the like. The shaft is diagrammatically represented in operative relation with the unit 10 and designated by reference numeral 14. The supporting member 11 is rigidly and co-rotatably fastened to the shaft 14, as by cap screws or the like 15 secured in holes 15a and engaging a flange or the like 16 on the shaft 14.

The supporting member 11 can be a metal stamping of annular configuration with suitably drawn formations affording mechanical strength, and fabricated projections as hereinafter noted. Thus an inside hub rim 17 in snug fitting relation with the shaft 14, and a circumferential exterior or peripheral rim 18, are joined by ribs 19 providing a desirable stiffness and reinforcing function. A plurality of preferably annular projections 20 are drawn or otherwise formed in uniformly angularly spaced relationship, preferably adjacent the peripheral rim 18 of the supporting member 11 and in predetermined radially spaced relation to the inner hub 17. The inner diameter surfaces of the outer ends of the projections 20 are flared or bell-mouthed in configuration, as indicated at 21, to permit gradual bending of the cables 13, which are inserted in snugly fitting relation in the projections 20, also as hereinafter further described.

It will, of course, be appreciated that variations in the construction of the supporting means 11 will be encompassed within the scope of the invention.

The inertial mass 12 desirably is a metal ring of uniform radial and axial cross-section and of predetermined weight although variations in this construction are encompassed within the scope of the invention as hereinafter set forth.

The mass 12 defines a plurality of apertures 22 whose inner ends 23 are chamfered or flared with a bell-mouthed configuration corresponding to the flared portions 21 in the projections 20. The apertures 22 are angularly uniformly spaced complementarily to the projections 20, and of corresponding inner dimension. In order to secure the spring cable elements 13 in the apertures 20 and 22, the outward ends of the cable elements may be welded to the outside face of the supporting member 11 and to the outside face of the inertial mass ring 12 by welds 24 and 25 respectively, although variation in the manner of connection of the cable elements 13 to the supporting element 11 and the inertial mass ring 12 is encompassed within the scope of the invention. It will be seen that the cable elements 13 have a uniform length and maintain the supporting element 11 and the inertial mass ring 12 in parallel registered relationship, with the cable elements being axially aligned in circumferential parallel relationship and in uniformly radially spaced relation to the shaft or main mass 14. Thus the inertial mass 12 is suspended in load-free cantilever relationship to the supporting member 11.

A plurality of rows of the resilient cable elements 13 can be utilized in accordance with the invention, with the respective rows disposed circumferentially in radially spaced relationship. In some instances, a staggered or mutually offset relationship for the cable elements may be utilized although the construction provided has the advantage of affording a predictable amplitude in the vibration damping inertial mass 12 which may be calibrated in terms of the radius for the uniformly radially spaced cable members 13. Further, the dimensions of the particular cable elements including the length of the cable elements; the weight of the inertial mass; and other features may be varied as circumstances may require. An out of phase relationship may be afforded such as to cancel the vibration emanating from the main rotating mass 14, with the energy taken up in the cable elements as described.

Also, the specific construction of the cable elements may be varied, and although a helical winding for the strands 26 is shown, other winding formations, and even a parallel strand construction may be used if desired for particular purposes. A major advantage of the invention, however, resides in the fact that the individual and discrete filaments or wires forming the respective strands 26 afford a multiplicity of separate energy absorbing interactions, and though the displacement of an individual strand may vary substantially with respect to a strand adjacent or remote therefrom in a given cable element, the overall result is a relatively uniform energy absorbing effect. Further, the strand construction shown provides for damping as a result of the interaction of the adjacent strands.

It will be seen that the weight of the metal cable elements 13 affords a degree of angular momentum and inertia which coacts with the inertial mass 12 in providing a damping mass system. The angular inertia thus afforded, and correspondingly the damping action, is relatively great as a result of the location of the center of mass and the effective moment peripherally relative to the main mass. Thereby, a relatively large torsional oscillation in the main mass, such as the shaft 14, may be taken up with a relatively small total mass for the damping system.

Referring now to FIGURES 3 and 4, another embodiment of the invention is shown wherein a torsional vibration damper 10a is provided which includes a supporting member 27, a load-free inertial mass 28, and a plurality of spring-action, semi-rigid, resiliently flexible cable elements 29 extending as spokes radially between the members 27 and 28 and supporting the inertial mass in uniformly radially spaced relation to the supporting member 27. The cable elements 29 are securely fastened, as by welding, to uniformly angularly spaced annular projections 30 in the supporting member 27, and the cable elements enter the projections at the curved juncture of the projections with the supporting member 27 to accommodate bending. The cable elements are also secured to radial openings 31 in the inertial mass 28, which openings may be flared outwardly at 32 to accommodate bending, as previously described. The cable elements 29 may be welded at 33 and 34 to the supporting and inertial members.

The spacing of the inertial mass 28 radially from the supporting element 27 provides a configuration which permits an installation in situations where axial length is limited but a substantial outside diameter is permitted. Thus the inertial mass 28 is not displaced axially by the cable members 29, but is instead directly radially aligned with the supporting member.

The supporting member 27 may be stamped and drawn (or otherwise formed) with a hub 35 and a peripheral annular flange 36 proximately radially spaced therefrom in which the projections 30 may be formed. The hub 35 may be secured to a main excited mass such as the shaft 14 shown in FIGURES 1 and 2. Cap screw openings 37 may be provided in the radially aligned section 38 of the supporting element interconnecting the hub or rim 35 and the annular flange 36, for this purpose.

The inertial mass 28 may have an axial dimension greater than its radial cross-section in the form shown, since the mass will be centered with respect to the supporting member 27. However, variations in this respect are encompassed within the scope of the invention. The number of the openings 31 in the mass 28, of course, corresponds to the number of openings in the supporting member provided by the projections 30, and the respective openings are uniformly angularly spaced, with the arc subtended by adjacent cables in the annular mass 28 corresponding to the arc subtended by the adjacent cables in the supporting member.

This relationship affords a natural difference in the amplitude of vibrations in the supporting member and the inertial mass, whereby bending of the cable members 13 will take up energy transmitted from the torsional oscillations in the main excited mass. The damping system 10a has the component parts thereof aligned in substantially coplanar relationship so that an exceptionally stable action is afforded.

The cable elements 29 may be formed similarly to the cable elements 13, and here again, variations in the particular construction shown is encompassed within the scope of the invention.

It may also be noted that the radial alignment of the cable elements 29 somewhat reduces the moment of inertia of these elements as compared with the embodiment of FIGURES 1 and 2, while increasing the amplitude of the external mass 28 relative to the amplitude of the vibrations of the excited mass, as hereinabove noted.

It will, of course, be appreciated that variation in the arrangement and location of the cable elements is encompassed within the scope of the invention, and pairs of cable elements may be used at specific spoke points along the supporting member.

Although the effective moment of damping force applied by the damping system including the cable elements is somewhat reduced as a result of the connection of the cable elements with the supporting member in closer radial relation to the exciting mass, the cable elements will themselves resist bending and have different effective moments along their lengths, so that a multiplicity of forces will be at work in the cable element strands and a very effective take-up of energy from the main excited mass will be afforded.

Referring now to FIGURES 5 and 6, another embodiment of the invention is shown which is generally designated by reference numeral 10b and which may be characterized as a double axial cable type of torsional vibration damper whose dynamic characteristics correspond generally to those of the first embodiment. The damper 10b includes deep drawn supporting member 39, on both sides of which are positioned inertial masses 40 and 41 respectively, and which are held in parallel spaced relation by a plurality of spring-action, semi-rigid, resiliently flexible cable elements 42. A ferrule 43 is securely swaged to the cable elements at mid-position axially thereof. The ferrule 43 is an annular member having openings 44 which are bell-mouthed at each end thereof to avoid localized fatigue of the cables as they are displaced, similarly to the preceding embodiment. The ferrule 43 is secured preferably by brazing, soldering or welding to an annular, axial projection 45 on the supporting member 39. Thus the embodiment 10b is particularly adapted for use in an installation where radial space limitations obtain but where a relatively large seismic mass is required.

The supporting member 39 includes a hub or rim 46 in radially inwardly displaced relation to the projection 45 and is adapted for connection to a crank shaft or the like by means of cap screws or the like inserted in openings 47 formed in a radial annular section 48 of the supporting member. The deep drawn construction described for the supporting member 39 provides an axially and outwardly extending annular section 49. However, a variety of constructions for the supporting member are encompassed within the scope of the invention.

The point of connection of the cable elements 42 with the rigid system of the supporting member and the excited mass connected thereto, is at a relatively large radius from the center of the excited mass, as compared with the preceding embodiment and a very effective damping action will be afforded despite any limitations in the overall radial dimensions of the system. The inertial masses 40 and 41 may have a configuration generally corresponding to the inertial mass 12 of FIGURE 1, and define openings 50 and 51 whose inner ends may be flared or chamfered as previously described to prevent localized fatigue of the cable elements during displacement thereof. The cable elements may be welded at 52 and 53 to the outer surfaces of the respective annular masses 40 and 41. And, as seen, the openings 50 and 51 correspond in number and angular spacing to the openings 44 in the annular ferrule 43. Desirably, the angular spacing of the openings and of the respective cable elements 42 is uniform and the cable elements are disposed in circumferentially parallel relationship adjacent the periphery of the system.

Although the mounting of the inertial members 40 and 41 on the respective cable elements 42 and their spacing from the ferrule 43 affords a relatively smaller amplitude for the inertial members, the provision of two such members serves to provide a relatively large total displacement of the cable elements. Thus, the vibrational effects of the excited mass or crankshaft will be effectively taken up in the cable elements. The amplitude of the oscillations in the inertial members 40 and 41 will in general be similar and will be proportional to the distance between the ferrule and the respective inertial masses 40 and 41; but it may be noted that the helical configuration of the strands in the cable elements 42 will cause some variation in this respect so that a slight out-of-phase relationship between the elements 40 and 41 may be afforded to effect multiple damping action. This latter effect also serves to augment the bending and energy take-up interactions in the strands of the cable elements 42.

Although two inertial masses have been shown in the construction 10b, additional balanced masses may be provided, along a relatively wider cable length if desired, and the cable length itself may be varied to meet particular conditions. Also, the cable elements could be centered initially in the supporting member itself rather than in the ferrule, although the ferrule provides an exceptionally secure and reliable mounting.

In all embodiments, as shown, it will be observed that the diameter of the relatively short cable elements is substantial relative to their free length; and their semi-rigidity, that is, substantial resistance to bending or flexing along the free lengths of the elements between their secured end portions, assures effective energy absorbing spring action.

It will thus be seen that I have provided a torsional vibration damper whose basic concept is applicable to a wide range of specific environments and which may be utilized in a variety of oscillating mases in addition to the crank shaft construction referred to. Although the system is simple and affords spring and inertial elements of inexpensive and reliable construction, the damping capacity thereof is sufficient for absorbing high energy oscillations, and this capacity may be varied as desired to meet particular frequencies and conditions by variation in the construction parameters. Further, the system may be calibrated in accordance with the several embodiments to meet the problems of restricted space, either axially or radially, and may be designed to accommodate different frequencies and intensities of the vibrations or torque impacts in the excited mass. Again, the system of the invention is not restricted dimensionally, or in respect to the particular materials of which it is made, so that, for example, the cable elements may be formed in a variety of ways in addition to those described, as may the supporting member for the damping mass and the inertial member or members of the damping mass. Likewise, although an annular construction for the inertial damping mass has been set forth, various geometrical configurations may also be provided in this respect, as for example, annularly spaced masses or other inertial mass formations may be utilized.

Although I have herein set forth and described my invention with respect to certain specific principles in

I claim as my invention:

1. A torsional vibration damper comprising supporting means adapted to be secured to a main rotatable mass, load-free inertial mass, and spring-action, semi-rigid resiliently flexible cable elements joining said supporting means and said load-free inertial mass and effective to absorb energy of rotational vibration from the main rotatable mass.

2. A torsional vibration damper comprising a load-free inertial mass and a semi-rigid cable element secured in supporting relation to the load-free inertial mass and mounted on a rotatable mass to absorb vibrational energy therefrom.

3. A torsional vibration damper comprising a load-free inertial mass and a semi-rigid cable element secured in supporting relation to the load-free inertial mass and adapted to be mounted on a rotatable mass to absorb vibrational energy therefrom, said cable element including a plurality of filaments inter-acting with one another to take up the vibrational energy by mechanical work and friction action and said filaments being arranged in a plurality of helically wound strands absorbing vibrational energy by mechanical work and friction from interaction with adjacent strands.

4. A torsional vibration damper comprising an annular supporting member, an annular inertial mass and a plurality of metal cable elements secured to the supporting member and the annular mass in axially oriented, angularly spaced relationship.

5. A torsional vibration damper comprising an annular supporting member, an annular inertial mass and a plurality of metal cable elements secured to the supporting member and the annular mass in axially oriented, angularly spaced relationship, said cable elements being in circumferentially uniformly spaced parallel relationship and in uniformly radially spaced relation to the inner margin of the annular supporting member.

6. A torsional vibration damper comprising an annular supporting member, a pair of annular inertial masses, and a plurality of metal cable elements secured intermediately thereof in axially oriented and peripherally spaced relation in the annular supporting member and each supporting one of the annular inertial masses on each end thereof.

7. A torsional vibration damper comprising an annular supporting member, an annular load-free inertial member having an inner diameter greater than the outer diameter of the annular supporting member and a plurality of spring-action, semi-rigid, resiliently flexible metallic cable elements secured to the supporting member and the load free inertial member at opposite ends of said metallic cable elements, said metallic cable elements being radially aligned in spoke-like array and effective to absorb energy from a rotatable mass to which the supporting member may be secured.

8. A torsional vibration damper comprising an annular sheet metal stamping providing a supporting member,
   an annular load-free inertial mass,
   and a plurality of spring-action semi-rigid resiliently flexible cable elements of a diameter such as to resist bending to assure effective energy absorbing spring action and interconnecting the supporting member and the load-free mass,
   said supporting member being provided with a hub flange portion adapted to be mounted on a rotatable mass and a radially outer flange portion to which said cable elements are attached.

9. A method of damping torsional vibrations comprising;
   connecting resiliently flexible spring-action, semi-rigid metallic cable elements in supporting relation between a load-free inertial mass and a rotatable mass to be damped,
   rotating the rotatable mass and the load-free inertial mass, and effecting a take-up of vibrational energy from the rotatable mass in the cable elements, including
       effecting differential frequency amplitudes between the rotatable mass and the load-free inertial mass and effecting mechanical work and friction in the cable elements.

10. A vibration damper comprising, in combination,
    a member to be attached to a mass subject to vibrations to be damped,
    a load-free inertia member,
    and combination coupling and damping means connecting said members and comprising compactly rubbingly interengaging mass of filaments in which the filaments interact frictionally to absorb energy in response to vibrations effecting relative movement of the members.

References Cited in the file of this patent
UNITED STATES PATENTS

| | | |
|---|---|---|
| 1,272,723 | Sullivan | July 16, 1918 |
| 1,758,274 | Butenkoff | May 13, 1930 |
| 2,843,171 | Howe | July 15, 1958 |
| 2,926,648 | Hamman | Mar. 1, 1960 |